Sept. 27, 1938.   W. J. COULTAS ET AL   2,131,273
COMBINED TANK AND ELEVATOR UNIT FOR AGRICULTURAL IMPLEMENTS
Filed May 20, 1935
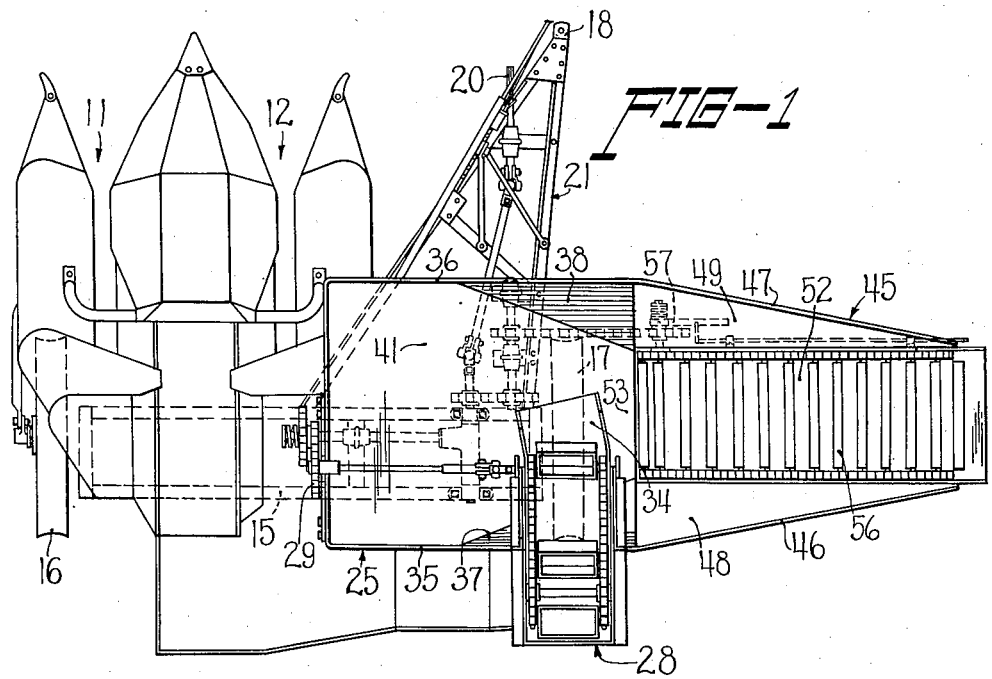
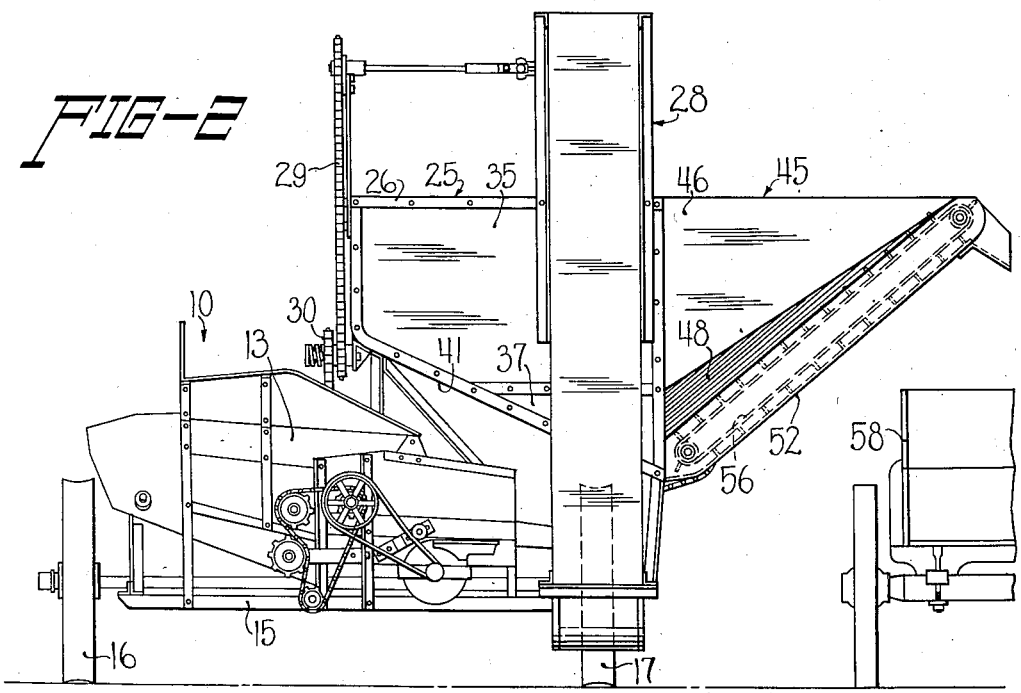
INVENTORS.
BY Wilbur J. Coultas and Nolan D. Colvin
Brown, Jackson, Boettcher & Dienner
ATTORNEYS.

Patented Sept. 27, 1938

2,131,273

UNITED STATES PATENT OFFICE 2,131,273

COMBINED TANK AND ELEVATOR UNIT FOR AGRICULTURAL IMPLEMENTS

Wilbur J. Coultas and Nolan D. Colvin, Moline, Ill., assignors to Deere & Company, Moline, Ill., a corporation of Illinois Application May 20, 1935, Serial No. 22,285

1 Claim. (Cl. 56—18)

The present invention relates generally to corn pickers and is particularly concerned with machines which are equipped with a grain tank arranged to receive the picked and gathered crop so that it is unnecessary to pull a wagon along with the machine when the latter is operating in the field. In machines which are not equipped with a grain tank, it is necessary either to provide an extra team to be used in drawing the wagon alongside the picker as the latter traverses the field, or a wagon hitch must be provided to which the wagon is connected, being drawn across the field by the tractor which pulls the corn picker.

Heretofore, in tank corn pickers the grain tank has been mounted in an elevated position on the picker, so that at the end of the row or other point in the field the grain may be dumped into a wagon by gravity. In such case it will be obvious that the grain tank must be positioned on the corn picker high enough to be well above the wagon bed. A disadvantage of such elevated grain tanks is that the picker is somewhat top heavy, especially when the tank is fairly full, and it is not easily maneuverable in the field. Especially is this true in machines where the corn picker is mounted on two wheels with the third point of support therefor carried on the propelling tractor itself. In these cases, the steering and handling of the tractor becomes difficult due principally to the weaving and rocking to which the high tank construction subjects the tractor. Also, these machines are affected by high winds, making them even more difficult to handle and unstable in operation.

In an effort to overcome these objectionable features, some corn pickers have been built having a grain tank arranged in an appreciably lower position. One advantage of this type of construction is that the stability of the machine and its maneuverability are not materially affected, even when the grain tank is filled substantially to capacity. However, when low down tanks are used, it is necessary to provide some form of elevator dump for the tank so that it may be emptied into a wagon or the like at the end of the row or at spaced points throughout the field, and usually a considerable amount of time is lost throughout the working day in emptying the ordinary low down tank.

The principal object of the present invention is to provide an improved tank and elevator construction which can not only be arranged in a low down position on the picker but can, at the same time, be quickly emptied. This is an important feature of the present invention, for where the elevator is so constructed and arranged that the contents of the grain tank are quickly discharged, there is no appreciable loss of time in using a machine of this type. A further advantage of this construction lies in the fact that appreciably less power is required for delivering the gathered crop into a low tank than is required to deliver the same into an elevated tank.

Another object of the present invention is the provision of a combined grain tank and elevator unit in which the elevating apparatus actually serves as a part of the receiving or storage section of the unit, thus increasing the capacity of the machine and, in addition, facilitating the rapid dumping of the gathered crop when the delivery point in the field is reached.

These and other objects and advantages of the present invention will be apparent to those skilled in the art after a consideration of the following detailed description of the preferred structural embodiment, taken in conjunction with the accompanying drawing illustrating such embodiment.

In the drawing:

Figure 1 is a top plan view of a harvesting machine embodying the principles of the present invention; and Figure 2 is a rear view of the machine shown in Figure 1.

The harvesting machine, preferably a corn picker, is indicated by the reference numeral 10 and includes the usual gathering mechanisms 11 and 12 and husking mechanism 13, as is usual in this type of machine. The various operating units forming parts of the picker are carried upon a framework indicated in its entirety by the reference numeral 15 and supported on a pair of wheels 16 and 17. The third point of support in the illustrated machine is at 18 on the tractor (not shown) by which the machine is drawn over the field and which, through suitable power take-off connections 20, is arranged to furnish the power for operating the various units. A draft frame 21 or the like serves to connect the machine with the tractor.

The combined tank and elevator unit is indicated by the reference numeral 25 and includes a grain tight storage tank section 26 to which the gathered crop is delivered, as by an upright tank elevator 28, usually of the bucket conveyor type, driven through suitable connections 29 and 30 from one of the operating parts on the picker, in accordance with the general practice in prior elevated grain tanks as well as prior low down tanks. The bucket elevator 28 discharges through a chute 34 or the like into the receiving section 26 of the tank unit 25. The section 26 includes side walls 35 and 36, which merge into downwardly converging portions 37 and 38, and a laterally sloping bottom wall 41 to which the downwardly converging side wall sections 37 and 38 are joined, as best shown in Figure 1, the sections 37 and 38 thereby serving as converging bottom wall portions.

The discharge elevator section of the combined tank and elevator unit is indicated by the reference numeral 45 and includes vertical side wall portions 46 and 47 which, like the above mentioned side walls 35 and 36, include inwardly and downwardly converging sections 48 and 49. The side walls 46 and 47 of the elevator unit 45 are firmly connected with the side walls 35 and 36, serving as a part thereof, and are extended upwardly above the downwardly converging wall portions 37 and 38. The elevator section 45 includes a sloping upwardly inclined bottom portion 52 arranged angularly opposite with respect to the bottom wall 41 of the receiving section 26. Thus, as the crop is delivered into the receiving section 26, any grain moving outwardly of the throat portion 53, where the converging wall portions 37, 38 and 41 meet, is caught by the side and bottom walls of the elevator section 45. This, in an appreciable measure, materially increases the capacity of the tank unit.

When the tank and elevator unit is filled, the machine is drawn alongside a wagon or other storage means so that the grain may be delivered thereto. Elevating mechanism 56 is movable over the bottom wall 52 of the elevator section 45 and, when operated, as by suitable power connections 57, the contents of the tank unit are quickly and easily emptied into the wagon 58. It will be noted from Figure 1 that the width of the bottom wall 52 and the elevating mechanism 56 is substantially equal to the width of the throat 53 of the grain receiving section 25. Due to this fact, and due further to the converging relation of the wall portions 37, 38 and 41, the rapid dumping or emptying of the unit 25 is effected.

While we have shown and described above the preferred form of our invention, it will be apparent to those skilled in the art that the present invention is not to be limited to the particular details shown and described above, but that, in fact, widely different means may be employed in the practice of the broader aspects of our invention.

What we claim, therefore, and desire to secure by Letters Patent is:

An agricultural machine comprising the combination of a corn picker having a supporting wheel, a grain receiving section carried on the picker in a relatively low position and having a laterally and downwardly sloping bottom wall and a pair of fore and aft end wall portions converging downwardly toward one side of the picker substantially directly above said wheel, an elevator section including side walls extending laterally outwardly and upwardly substantially from the junction of the bottom and end wall portions substantially directly above said wheel and a bottom wall joining said side walls in grain tight relation and inclined upwardly and laterally outwardly of the picker, elevating means operable over said inclined bottom wall to empty said receiving section, and an elevator fastened to the rear wall of said receiving section substantially in the plane of said wheel and adapted to receive corn from said picker and to deliver the same into said receiving section over the rear wall thereof.

WILBUR J. COULTAS.
NOLAN D. COLVIN.